United States Patent Office 3,437,679
Patented Apr. 8, 1969

3,437,679
PROCESS FOR THE PRODUCTION OF 2,2,6,6-TETRAMETHYL-2,6-DISILA-1,4-DIOXAN
Walter Simmler, Odenthal-Schlinghofen, Hans Niederprum, Monheim, and Hans Sattlegger, Cologne-Buchheim, Germany, assignors to Farbenfabriken Bayer Aktiengesellschaft, Leverkusen, Germany, a corporation of Germany
No Drawing. Filed July 6, 1966, Ser. No. 563,045
Claims priority, application Germany, July 30, 1965,
F 46,755
Int. Cl. C07d *103/02*
U.S. Cl. 260—448.2        2 Claims This invention relates to the production of symmetrical tetramethyldisiladioxan of the formula

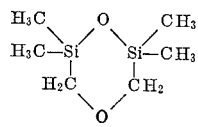

This compound is suitable as a distillable, and thus readily purifiable, intermediate for well-defined and uniform incorporation as a modifier by polymerization in organopolysiloxanes, for example siloxane elastomers, and silicon-free synthetic materials, for example polyalkylene oxides. It has hitherto been produced by heating 1,3 - di(hydroxymethyl)tetramethyldisiloxane with sulphuric acid, but this method gave yields of less than 20% (Journal of Organic Chemistry, 25 (1960), 1637–1640).

We have now found that by using p-toluene sulphonic acid as the catalyst instead of sulphuric acid, while observing certain conditions, yields between 80 and 90% of the theoretical amount of the cyclic ether are obtainable, and according to the present invention a process for producing 2,2,6,6-tetramethyl - 2,6 - disila - 1,4 - dioxan comprises heating 1,3 - di(hydroxymethyl)tetramethydisiloxane in the presence of p-toluene sulphonic acid as catalyst in a column distillation apparatus to a temperature in the range 100 to 150° C. at atmospheric pressure until approximately 0.8 mol water per mol disiloxane has distilled over together with a part of the product of the process, adding to the reaction mixture a fresh catalytic amount of p-toluene sulphonic acid, and then heating the mixture under reduced pressure at 120 to 180° C. to distil over the remainder of the product.

It is important that the water released in the etherification of the hydroxymethyl group while hot distils off only gradually at first, so as to avoid the formation of esterification products with the atomic sequence —Si—O—C—Si—O—C— instead of the desired condensate with the alternate ether and siloxane groups —Si—O—Si—C—O—C. Only when the condensation reaction of the original hydroxyl radicals is substantially over is the process taken to completion, and for this a further addition of p-toluene sulphonic acid is necessary, since the initially added amount becomes for the most part inactive through esterification with linear polymers formed by way of Si-linked hydroxymethyl end-groups. These high polymers are then depolymerized to the desired product by continued heating, while the product is steadily distilled off.

Since according to a process proposed elsewhere the dihydroxymethyldisiloxane used as starting material can be advantageously produced by transesterification of a 1,3 - di(acyloxymethyl)tetramethyldisiloxane or a dimethyl(acyloxymethyl)acyloxy- or -alkoxysilane, with a manifold excess of methanol in the presence of p-toluene sulphonic acid, the process according to the invention can be effected by employing this transesterification product in the raw state directly, i.e., without isolating it from the p-toluene sulphonic acid, the latter being used furthermore as catalyst in the process according to the present invention.

The following examples are given for the purpose of illustrating the invention.

EXAMPLE 1

A mixture of 97 g. (0.5 mol) 1,3-di-(hydroxymethyl)-tetramethyldisiloxane and 4 g. p-toluene sulphonic acid is heated in a distillation apparatus until at a temperature above 100° C. a two-phase distillate is observed, the heavier phase of which consists of water; the lighter phase is 2,2,6,6-tetramethyl-2,6-disila-1,4-dioxan. The distillation is continued by gradually raising the temperature, according to the measure of the distillate, up to 150° C. until about 7 g. of water have been collected. The reaction mixture is then allowed to cool to 100° C., a further 4 g. p-toluene sulphonic acid are added, and the distillation is completed by heating to 120 to 180° C. under reduced pressure. Altogether 88% of the theoretical amount is obtained of 2,2,6,6-tetramethyl-2,6-disila-1,4-dioxan, with a boiling point at 3 mm. Hg of 30° C. and a refractive index $n_D^{20} = 1.4288$, containing 40.64% C and 9.15% H (calculated: 40.85% C and 9.14% H).

EXAMPLE 2

A solution of 190.3 g. (1 mol) dimethyl(acetoxymethyl)acetoxysilane and 5.7 g. p-toluene sulphonic acid in 320 g. (10 mols) methanol is heated, gradually distilling off methyl acetate, methanol and water, up to 150° C., until about 25 g. water have distilled over. After cooling, the process is continued with the addition of further p-toluene sulphonic acid and distillation as in Example 1. The yield of 2,2,6,6-tetramethyl-2,6-disila-1,4-dioxan amounts to 83%; $n_D^{20} = 1.4290$.

What we claim is:
1. A process for the production of 2,2,6,6-tetramethyl-2,6-disila-1,4-dioxan which comprises heating 1,3-di(hydroxymethyl(tetramethyldisiloxane in the presence of p-toluene sulphonic acid as catalyst in a column distillation apparatus to a temperature in the range 100 to 150° C. at atmospheric pressure until about 0.8 mol water per mole of disiloxane has distilled over together with part of the product, adding to the reaction mixture a further catalytic amount of p-toluene sulphonic acid, and then heating the mixture under reduced pressure at 120 to 180° C. to distil over the remainder of the product.
2. A process as claimed in claim 1 wherein the 1,3-di(hydroxymethyl)tetramethyldisiloxane is produced by transesterification of a 1,3-di(acyloxymethyl)tetramethyldisiloxane, a dimethyl(acyloxymethyl)acyloxysilane, or a dimethyl(acyloxymethyl)alkoxysilane.

References Cited
UNITED STATES PATENTS
2,898,346   8/1959   Eynon _____ 260—448.2 X
3,369,039   2/1968   Emden et al. ____ 260—448.2 X TOBIAS E. LEVOW, *Primary Examiner.*
P. F. SHAVER, *Assistant Examiner.*

U.S. Cl. X.R.
260—46.5, 611